(12) United States Patent
Iyengar et al.

(10) Patent No.: US 12,511,937 B2
(45) Date of Patent: Dec. 30, 2025

(54) SYSTEM AND METHOD FOR CLASSIFYING ACTIVITY OF USERS BASED ON MICRO-EXPRESSION AND EMOTION USING AI

(71) Applicant: RN CHIDAKASHI TECHNOLOGIES PRIVATE LIMITED, Mumbai (IN)

(72) Inventors: Prashant Iyengar, Mumbai (IN); Hardik Godara, Jodhpur (IN)

(73) Assignee: RN CHIDAKASHI TECHNOLOGIES PRIVATE LIMITED, Mumbai (IN)

(*) Notice: Subject to any disclaimer, the term of this patent is extended or adjusted under 35 U.S.C. 154(b) by 283 days.

(21) Appl. No.: 18/283,441

(22) PCT Filed: Mar. 23, 2022

(86) PCT No.: PCT/IN2022/050289
§ 371 (c)(1),
(2) Date: Sep. 21, 2023

(87) PCT Pub. No.: WO2022/201196
PCT Pub. Date: Sep. 29, 2022

(65) Prior Publication Data
US 2024/0177524 A1 May 30, 2024

(30) Foreign Application Priority Data

Mar. 23, 2021 (IN) .............................. 202121012324

(51) Int. Cl.
*G06V 40/16* (2022.01)
*G06V 40/20* (2022.01)
*G10L 15/18* (2013.01)

(52) U.S. Cl.
CPC ............ *G06V 40/20* (2022.01); *G06V 40/174* (2022.01); *G10L 15/1815* (2013.01)

(58) Field of Classification Search
CPC .... G06V 40/20; G06V 40/174; G06V 40/176; G06V 40/25; G10L 15/1815; G09B 5/06;
(Continued)

(56) References Cited

U.S. PATENT DOCUMENTS

| | | | |
|---|---|---|---|
| 2016/0042648 A1* | 2/2016 | Kothuri | G06V 40/166 434/236 |
| 2018/0150739 A1* | 5/2018 | Wu | G06N 20/10 |

(Continued)

*Primary Examiner* — Carol W Chan

(57) ABSTRACT

A system and method for automatically classifying an activity of a user 102 during a proposal by an agent 104 to a user based on micro-expression and emotion of the user that provides a succeeding response to the agent 104 such that the proposal becomes successful using an artificial intelligence model is provided. The system includes a facial micro-expression unit 106, an expression analyser 110, the artificial intelligence model 112. The facial micro-expression unit 106 captures an interactive sequence of audio-visual information. The expression analyser 110 processes the interactive sequence of audio-visual information using the artificial intelligence model to determine an emotion and intensity of emotion of the user. The expression analyser 110 creates a record of a set of questions and responses. The expression analyzer 110 provides the succeeding response to the agent based on the created record using a wearable device 114.

10 Claims, 9 Drawing Sheets

(58) Field of Classification Search
CPC ... G06Q 10/06398; G06Q 30/06; G06N 20/00
See application file for complete search history.

(56) References Cited

U.S. PATENT DOCUMENTS

| | | | | |
|---|---|---|---|---|
| 2018/0357473 | A1* | 12/2018 | Soma | G06V 40/20 |
| 2019/0348063 | A1* | 11/2019 | Vaculin | G06V 40/174 |
| 2020/0152197 | A1* | 5/2020 | Penilla | H04L 67/125 |
| 2021/0390288 | A1* | 12/2021 | Mittal | G06N 3/084 |

* cited by examiner

SYSTEM AND METHOD FOR CLASSIFYING ACTIVITY OF USERS BASED ON MICRO-EXPRESSION AND EMOTION USING AI

CROSS-REFERENCE TO PRIOR-FILED PATENT APPLICATIONS

This application claims priority from the Indian provisional application no. 202121012324 filed on Mar. 23, 2021, which is herein incorporated by reference.

BACKGROUND

Technical Field

Embodiments of this disclosure generally relate to a framework for semantic and affective processing of interactive experience, and more particularly, to a system and method for automatically classifying an activity of a user during a proposal by an agent to a user based on micro-expression and emotion of the user using an artificial intelligence model.

Description of the Related Art

An Artificial Intelligence (AI) allows a user to interact with a plurality of applications, a plurality of websites, and a plurality of devices, etc. via text, voice, audio, video, etc. The AI uses a plurality of technologies to process and contextualize user input to respond to the user. Nowadays, AI has been used by businesses to create personalized customer experiences. Companies continue to develop a variety of AI to interact with customers. Though the variety of AI emerges day by day, more research are still going on to develop an AI that enables the fastest user interaction which in turn improves users' conversational experience.

An architecture for AI captures a plurality of audiovisual of the user that illustrates execution steps of operations and corresponding interconnections between the user and the agent in a plurality of environments. Conventional architecture for the AI consumes more time in terms of computer resource processing and the response time for the user input is high. Thus, the conventional architecture for AI may impede the functioning of a computing device that is used for a conversational purpose or by identifying the activity of the user manually. Further, existing architecture for segmentation of activity and identification of activity is most complex in terms of design and does not support for any form of identifying audiovisual conversation to predict the activity of the user. There is no single architecture that is capable of supporting any form of identifying audiovisual and video conversations to predict the activity of the user. Existing AI requires data of the user manual to identify the user activity and increase the complexity of implementation. Hence, the existing AI system supports only limited identifying modalities such as speech, and video. Still, research is going on for a semantic and affective evaluation of interactive experience architecture that is capable of supporting any form that executes segmentation of activity and identification of activity.

Accordingly, there remains a need for a more efficient system and method for mitigating and/or overcoming drawbacks associated with current methods.

SUMMARY

In view of foregoing an embodiment herein provides a system for automatically classifying an activity of a user during a proposal by an agent to the user based on micro-expression and emotion of the user using an artificial intelligence model. The system includes a facial micro-expression unit. The facial micro-expression unit is mounted at a position close to the user to (i) capture a face of the agent and a face of the user appropriately, and (ii) record a voice of the agent and a voice of the user. The facial micro-expression unit includes at least one camera or a microphone to capture an interactive sequence of audio-visual information during the proposal by the agent. The system includes an expression analyzer. The expression analyzer acquires the interactive sequence of audio-visual information continuously in real-time from the facial micro-expression unit and processes the sequence of the audio-visual information using the artificial intelligence model. The expression analyzer includes a memory unit that stores a database and the artificial intelligence model and a processor that is configured to execute a set of instructions and is configured to, (i) train the artificial intelligence model using historical interactive sequences of audio-visual information between the user and the agent, historical activities of the user, historical proposals, historical users, historical agents, historical succeeding responses by, (a) segmenting, using semantic analysis technique, a conversation of the historical interactive sequence of audio-visual information during a historical proposal by analyzing a context of the conversation to determine an exact meaning of words in the conversation based on the context, (b) determining, using a micro-expression analysis technique and a gait analysis technique, at least one historical emotion of the user and historical intensity of the at least one emotion, (c) correlating the historical audio-visual session with the at least one emotion of the user, and the intensity of the at least one emotion to classify an activity into at least one of positive events or negative events, the positive events refer to a successful proposal and the negative events refer to an unsuccessful proposal, (d) obtaining a trained artificial intelligence model by associating a historical succeeding response of the user during the historical proposal based on the classification of the activity; (ii) determine, using the trained artificial intelligence model, the at least one emotion, and the intensity of the at least one emotion of the user during the proposal in real-time; (iii) provide a successful response to the agent by creating, a record of a set of questions and responses from at least one of (1) the determined at least one emotion, and the determined intensity of the at least one emotion of the user during the proposal in real-time, or (2) the response is detected if a question is from the standard training record; and (iv).

In some embodiments, the processor is configured to detect pairs of dialogue adjacency between the user and the agent to identify the exact meaning of words in the conversation.

In some embodiments, the processor is configured to combine at least one answer by the agent from the created record of the set of questions and responses based on the pairs of dialogue adjacency when at least one new question is asked by the user.

In some embodiments, the processor is configured to retrain the artificial intelligence if there is a misalignment between real-time response and a predicted event for the proposal by the agent to the user.

In some embodiments, the processor is configured to identify a new set of questions asked by the user in the real-time proposals by the agent to the user for training the artificial intelligence model.

In some embodiments, the processor is configured to determine at least one muscle point on the face of the user and identifying at least one micro expression of the user and at least one physical movement of the user. In some embodiments, the proposal is varied using at least one of a user's identity profile, a gender, age, ethnicity detection, or positive or negative responses from the users to make the proposal successful.

In some embodiments, the processor is configured to identify the historical proposal that is successful and unsuccessful related to a group of users for training the agent.

In some embodiments, the interactive sequence of audio-visual information includes at least one of a sequence of visual frames captured by the facial micro-expression unit, or a sequence of audio frames captured by the facial micro-expression unit. In some embodiments, the successful response is communicated to the agent through a wearable device.

In one aspect, a processor-implemented method for automatically classifying an activity of a user during a proposal by an agent to the user based on micro-expression and emotion of the user using an artificial intelligence model is provided. The method includes capturing a face of the agent and a face of the user appropriately and recording a voice of the agent and a voice of the user clearly by a facial micro-expression unit that is mounted at a position close to the user, the facial micro-expression unit includes at least one camera or a microphone to capture an interactive sequence of audio-visual information during the proposal by the agent. The method includes acquiring, by an expression analyzer, the interactive sequence of audio-visual information continuously in real-time from the facial micro-expression unit and processing the sequence of the audio-visual information using the artificial intelligence model. The method includes training the artificial intelligence model using historical interactive sequences of audio-visual information between the user and the agent, historical activities of the user, historical proposals, historical users, historical agents, historical succeeding responses by, (a) segmenting, using semantic analysis technique, a conversation of the historical interactive sequence of audio-visual information during a historical proposal by analyzing a context of the conversation to determine an exact meaning of words in the conversation based on the context, (b) determining, using a micro-expression analysis technique and a gait analysis technique, at least one historical emotion of the user and historical intensity of the at least one emotion, (c) correlating the historical audio-visual session with the at least one emotion of the user, and the intensity of the at least one emotion to classify an activity into at least one of positive events or negative events, the positive events refer to a successful proposal and the negative events refer to an unsuccessful proposal, and (d) obtaining a trained artificial intelligence model by associating a historical succeeding response of the user during the historical proposal based on the classification of the activity; (ii) determine, using the trained artificial intelligence model, the at least one emotion, and the intensity of the at least one emotion of the user during the proposal in real-time. The method includes providing a successful response to the agent by creating, a record of a set of questions and responses from at least one of (i) the determined at least one emotion, and the determined intensity of the at least one emotion of the user during the proposal in real-time, or (ii) the response is detected if a question is from the standard training record.

The system analyzes to estimate positive or negative reactions of customers during a sales event. The system evaluates the conversation between the agent and the customer and provides a successful response to the agent based on the reaction of the customer to make the sale a successful event.

The system installs a camera mounted in the classroom to analyze the facial expression to estimate positive or negative reactions of the students in the classroom when the lecture is in progress. The system also performs gait analysis during the lecture, thereby helping the tutor vary the lesson plan in accordance with the response of the student in the classroom. The system analyzes a lesson plan, a topic of the lecture, tutor information, an average emotional response of the learner, and an associated engagement score and stores the evaluation metrics of the session. The system evaluates the learning session score of the students across several lesson plans and generates a report for the tutor indicating the learner's emotional engagement score associated with the assessment score.

The system is used by the human resources department during the recruitment interview process. The system located in the interview venue captures audio visual interaction between the candidate and interviewer. In some embodiment, the system analyzes the audio-visual feed of the digital interface during a virtual interview process. The system records the questions of the interviewer and the corresponding response of the candidate and provides the interviewer with audiovisual or tactile feedback in real-time if the candidate exhibits a negative reaction while answering a question. The system records an investigative session and is used by the police and investigative agencies while questioning the suspect.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

Figure 1:
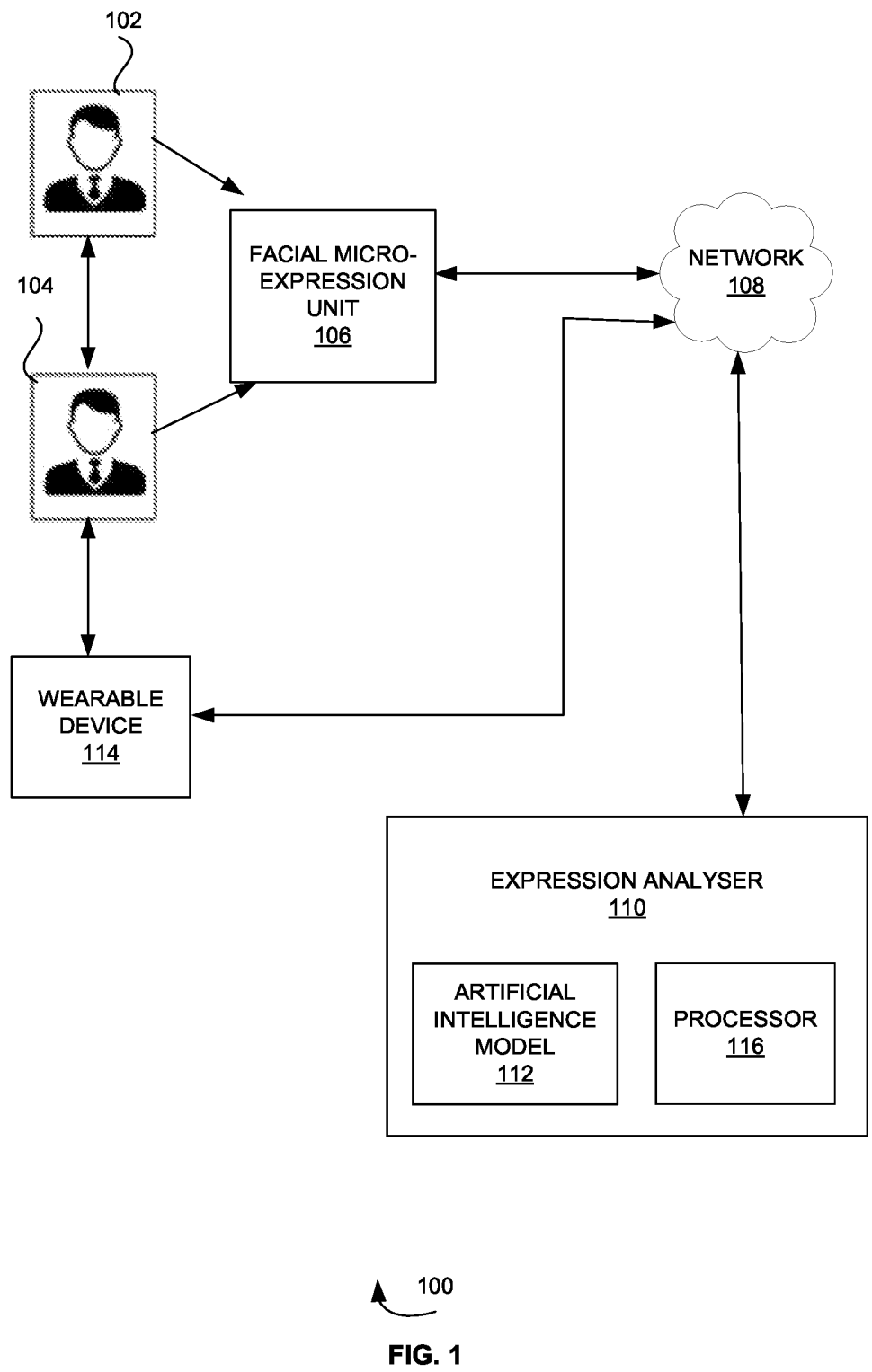
FIG. 1 is a block diagram of a system for automatically classifying an activity of a user during a proposal by an agent using an artificial intelligence model according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a system and method for automatically classifying an activity of a user during a proposal by an agent using an artificial intelligence model. The embodiments herein achieve this by proposing a system for automatically classifying an activity of a user during a proposal by an agent to a user based on micro-expression and emotion of the user that provides a succeeding response to the agent such that the proposal becomes successful using an artificial intelligence model. Referring now to the drawings, and more particularly to FIGS. 1 through 8, where similar reference characters denote corresponding features consistently throughout the figures, there are shown preferred embodiments.

FIG. 1 is a block diagram of a system 100 for automatically classifying an activity of a user 102 during a proposal by an agent 104 using an artificial intelligence model 112 according to some embodiments herein. The system 100 includes a facial micro-expression unit 106, and an expression analyzer 110. The facial micro-expression unit 106 includes at least one camera or a microphone. The camera may be smart glass or a body camera or a rotating camera. The microphone may be a hearable, or glasses. The facial micro-expression unit 106 is mounted at a position close to the user 102 and the agent 104. The facial micro-expression unit 106 captures a face of the agent 104 and a face of the user 102 appropriately. The facial micro-expression unit 106 records a voice of the agent 104 and a voice of the user 102. The facial micro-expression unit 106 captures an interactive sequence of audio-visual information during the proposal by the agent 104. The interactive sequence of audio-visual information includes a sequence of visual frames, and a sequence of audio frames. The expression analyzer 110 includes an artificial intelligence model 112. The expression analyzer 110 acquires the interactive sequence of audio-visual information continuously in real-time from the facial micro-expression unit 106 through a network 108. In some embodiments, the network 108 is a wired network or a wireless network. In some embodiments, the network 108 is a combination of a wired and wireless network. In some embodiments, the network 108 is the Internet. The expression analyzer 110 processes the sequence of the audio-visual information using the artificial intelligence model 112. The expression analyzer 110 includes a memory unit that stores a database and the artificial intelligence model 112 and a processor 116 that is configured to execute a set of instructions. The agent 104 accesses a wearable device 114. The wearable device 114 without limitation, is selected from a smart watch, wearable camera, hearable, or glasses.

The facial micro-expression unit 106, the expression analyzer 110, and the wearable device 114 are communicatively connected through the network 108.

The expression analyzer 110 trains the artificial intelligence model 112 by providing historical interactive sequences of audio-visual information between the user 102 and the agent 104, historical activities of the user, historical proposals, historical users, historical agents, historical succeeding responses. The expression analyzer 110 segments a conversation of the historical interactive sequence of audio-visual information during a historical proposal by analyzing a context of the conversation to determine an exact meaning of words in the conversation based on the context using semantic analysis technique.

The semantic analysis technique understands a conversation using the natural language how humans communicate based on meaning and context. The semantic analysis technique analyzes the context in the surrounding text of the conversation and analyzes the structure of the text to accurately disambiguate proper meaning of words that have more than one definition.

The expression analyzer 110 determines historical emotion of the user 102 and historical intensity of the emotion by determining muscle points on the face of the user 102 and identifying a micro expression of the user 102 using a micro-expression analysis technique and a gait analysis technique.

The micro-expression analysis technique may analyze facial movements of the user 102. The facial movements of the user 102 are used to describe visually distinguishable facial activity of the user 102. The facial activity of the user 102 is used to recognize micro-expressions of the user 102 such that an emotion of the user 102 is classified. The emotion of the user may be happiness, disgust, surprise, repression, etc., and the like The gait analysis technique may analyze the physical movements of the user 102 using the facial micro-expression unit 106. The physical movements of the user 102 may be captured from different angles. The different angle may be front, back, and one or both sides.

The expression analyzer 110 correlates the historical audio-visual session with the emotion of the user, and the intensity of the emotion to classify an activity into positive events or negative events. The positive events refer to a successful proposal and the negative events refer to an unsuccessful proposal. The expression analyzer 110 obtains a trained artificial intelligence model by associating a historical succeeding response of the user 102 during the historical proposal based on the classification of the activity. The expression analyzer 110 determines the emotion, and the intensity of the emotion of the user 102 during the proposal in real-time using the trained artificial intelligence model. The expression analyzer 110 creates a record of a set of questions and responses from the determined emotion, and the determined intensity of the emotion of the user 102 during the proposal in real-time, and the response is detected if a question is from the standard training record. The expression analyzer 110 provides the succeeding response to the agent 104 such that the proposal becomes successful using the record of the set of questions and responses. The succeeding response is communicated to the agent 104 through the wearable device 114.

In an exemplary embodiment, the system 100 acts as a virtual assistant with audiovisual capabilities for a sales agent during a sales proposal. The system 100 may analyze the conversation between the user 102 and the sales agent to provide a succeeding response automatically to become the sales proposal successful using the trained machine learning model. In some embodiments, the system 100 provides an automated smart virtual assistant to the sales agent to make the sales proposal a successful one.

In an exemplary embodiment, the system 100 functions as an educational assistant with audiovisual capabilities. The educational assistant may be available in the user's home. An emotional assessment module of the educational assistant may assess the user's emotional state automatically while a lesson is in progress and rate the virtual classroom experience. The virtual classroom may include a plurality of users, such as the students. In some embodiments, during the course of the lesson, the system 100 may assess the individual emotional response of students in the virtual classroom and also manipulates the average emotional response of the one or more students in the classroom. The system 100 alerts the tutor based on the emotional response to make necessary changes in the lesson. In some embodiment, the system 100 is installed in a physical classroom to provide tactile visual feedback to the tutor.

The system 100 may install at least one of smart glass or a body camera or a rotating camera mounted as the facial micro-expression unit 106 in the classroom which rotates and locates faces of students in the classroom to analyze the facial expressions, positive or negative reactions of the students in the classroom when the lecture is in progress. The system 100 also performs gait analysis during the lecture and uses facial expressions, reactions of the students in the classroom. The gait analysis may provide feedback to the tutor about the status of students during the lesson, thereby helping the tutor vary the lesson plan in accordance with the response of the student in the classroom.

The system 100 may analyze a lesson plan, a topic of the lecture, tutor information, an average emotional response of the learner, and an associated engagement score and store the evaluation metrics of the session. In some embodiments, the evaluation metrics of the session that include engagement ratio of the classroom, test performance, and feedback on tutors by students from the learning session score for a session is evaluated. In some embodiments, the engagement ratio of the classroom is measured based on a number of questions asked in the classroom. In some embodiments, the system 100 evaluates the learning session score of the one or more students across several lesson plans and generates a report for the tutor indicating the learner's emotional engagement score associated with the assessment score.

In some embodiments, the system 100 analyzes the average emotional assessment of the class automatically during the delivery of a topic that consists of multiple lesson plans associated with specific concepts created for learners of different competency levels. In some embodiments, the lesson plan includes prerequisite topics to be covered. In some embodiments, during the average emotional assessment, the positive emotional score indicates a good understanding of the concept and a negative emotional score indicates a poor understanding of the concept. The system 100 may facilitate the tutor to assess the learn-ability level of the one or more students and tune the competency level of the concept to match the understanding level of the one or more students in the classroom. In some embodiments, the same is carried out for different classrooms and the concepts tutored are based on the competency levels of a particular class, thereby contributing to increased teaching outcomes. In some embodiments, the system 100 enables tutors to customize an ideal lesson plan and knowledge base based on the competency level of the learner. In some embodiments, the learners are the students. In some embodiments, the Artificial Intelligence (AI) system is used as an automated tutor which can deliver a learning knowledge base in accordance with the competency of the learner.

In some embodiments, the system 100 allows the tutor, a trainer, or an educational institute to view the audio-visual interaction and emotional reaction of the students as audio-visual feedback to review the lesson plan and assess the learning or teaching quality of the tutor.

In another exemplary embodiment, the system 100 is used by the human resources department during the recruitment interview process. The system 100 may be located in the interview venue that captures audiovisual interaction between the candidate and interviewer. In some embodiments, the system analyzes the audio-visual feed of the digital interface during a virtual interview process. The system may record the questions of the interviewer and the corresponding response of the candidate and provide the interviewer with audiovisual or tactile feedback in real-time if the candidate exhibits a negative reaction while answering a question. In some embodiments, psychometric and behavioral tests are administered using the digital interface. In some embodiments, the system 100 monitors the question and response along with the emotional reaction of the user 102 while responding.

In some embodiments, the psychometric tests work under the assumption that the candidate is not stressed or is having dishonest motives. The system 100 may monitor the emotional state of the candidate during psychometric tests and provide behavioral scores taking into consideration the emotional state of the candidate. In some embodiments, the system 100 records an investigative session and is used by the police and investigative agencies while questioning the suspect.

Figure 2:
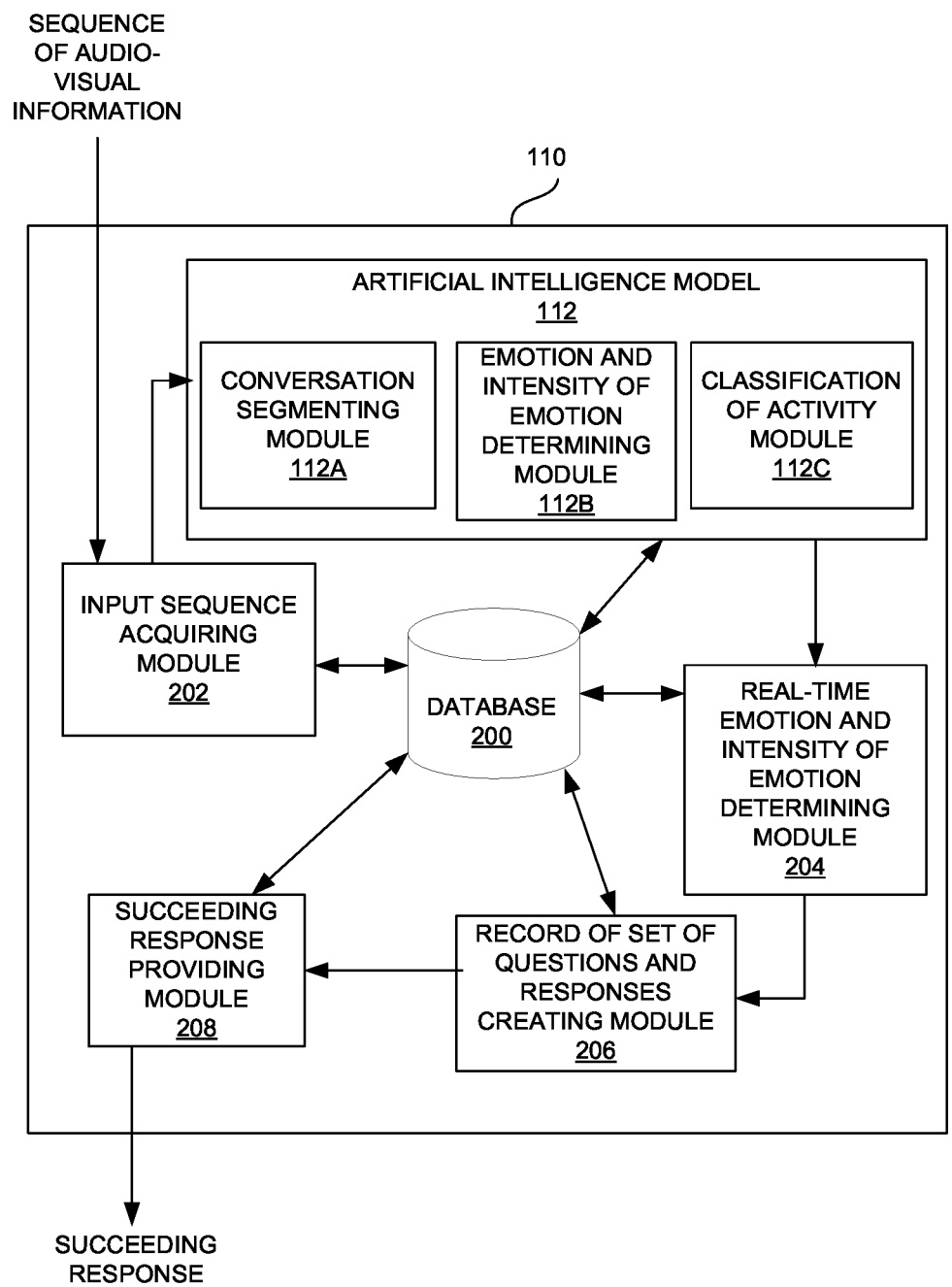
FIG. 2 illustrates a block diagram of an expression analyzer of FIG. 1 according to some embodiments herein.

FIG. 2 illustrates a block diagram of the expression analyzer 110 of FIG. 1 according to some embodiments herein. The expression analyzer 110 includes an input sequence acquiring module 202, the artificial intelligence model 112, a real-time emotion and intensity of emotion determining module 204, a record of set of questions and responses creating module 206, a succeeding response providing module 208, and a database 200. The input sequence acquiring module 202 acquires the interactive sequence of audio-visual information continuously in real-time from the facial micro-expression unit 106 through the network 108.

The artificial intelligence model 112 is trained by providing historical interactive sequences of audio-visual information between the user 102 and the agent 104, historical activities of the user, historical proposals, historical users, historical agents, historical succeeding responses. The artificial intelligence model 112 includes a conversation segmenting module 112A, an emotion and intensity of emotion determining model 112B, a classification of activity module 112C. The conversation segmenting module 112A segments a conversation of the historical interactive sequence of audio-visual information during a historical proposal by analyzing a context of the conversation to determine an exact meaning of words in the conversation based on the context using semantic analysis technique. The emotion and intensity of emotion determining model 112B determines historical emotion of the user 102 and historical intensity of the emotion by determining muscle points on the face of the user 102 and identifying a micro expression of the user 102 using a micro-expression analysis technique and a gait analysis technique.

The classification of activity module 112C correlates the historical audio-visual session with the emotion of the user, and the intensity of the emotion to classify an activity into positive events or negative events. The positive events refer to a successful proposal and the negative events refer to an unsuccessful proposal.

The real-time emotion and intensity of emotion determining module 204 obtains a trained artificial intelligence model by associating a historical succeeding response of the user 102 during the historical proposal based on the classification of the activity. The real-time emotion and intensity of emotion determining module 204 determines the emotion, and the intensity of the emotion of the user 102 during the proposal in real-time using the trained artificial intelligence model. The record of the set of questions and responses creating module 206 creates a record of a set of questions and responses from the determined emotion, and the determined intensity of the emotion of the user 102 during the proposal in real-time and the response is detected if a question is from the standard training record. The succeeding response providing module 208 provides the succeeding response to the agent 104 such that the proposal becomes successful using the record of the set of questions and responses. The succeeding response is communicated to the agent 104 through the wearable device 114.

Figure 3:
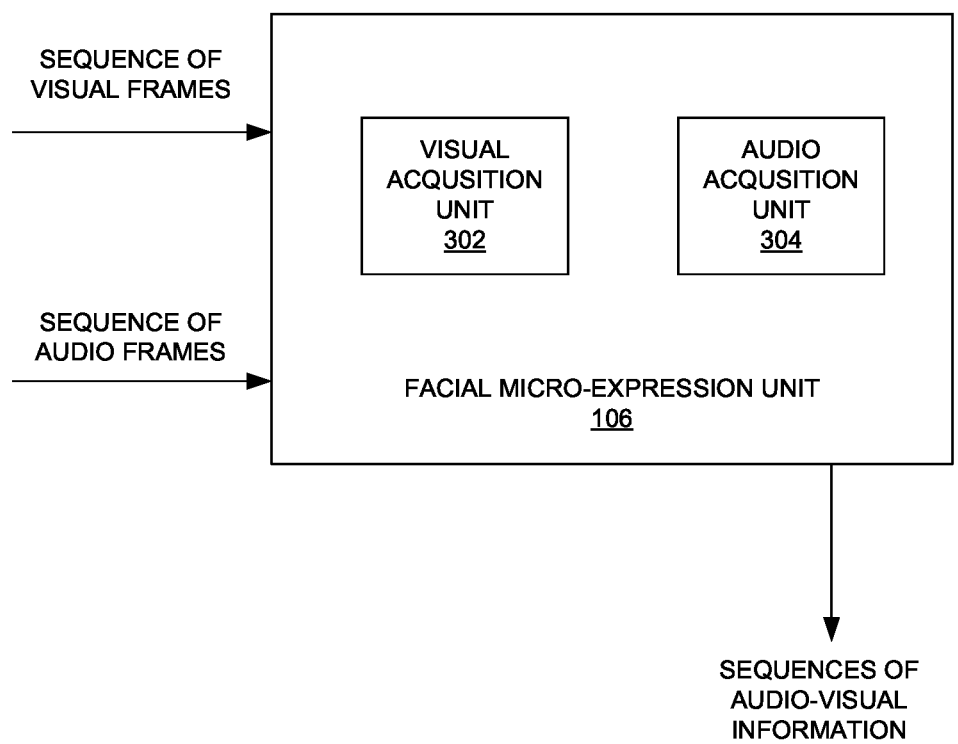
FIG. 3 illustrates a block diagram of a facial micro-expression unit of FIG. 1 according to some embodiments herein.

FIG. 3 illustrates a block diagram of the facial micro-expression unit 106 of FIG. 1 according to some embodiments herein. The facial micro-expression unit 106 includes a visual acquisition unit 302, and an audio acquisition unit 304. The visual acquisition unit 302 may include a camera. The visual acquisition unit 302 captures face of the agent 104 and a face of the user 102 appropriately. The visual acquisition unit 302 captures a sequence of visual frames of face of the agent 104 and a face of the user 102 appropriately. The audio acquisition unit 304 may include a microphone. The audio acquisition unit 304 records a sequence of audio frames of a voice of the agent 104 and a voice of the user 102. The facial micro-expression unit 106 is mounted at a position close to the user 102 and the agent. The sequence of visual frames and the sequence of audio frames are combined to generate an interactive sequence of audio-visual information during a proposal by the agent 104 to the user 102.

Figure 4:
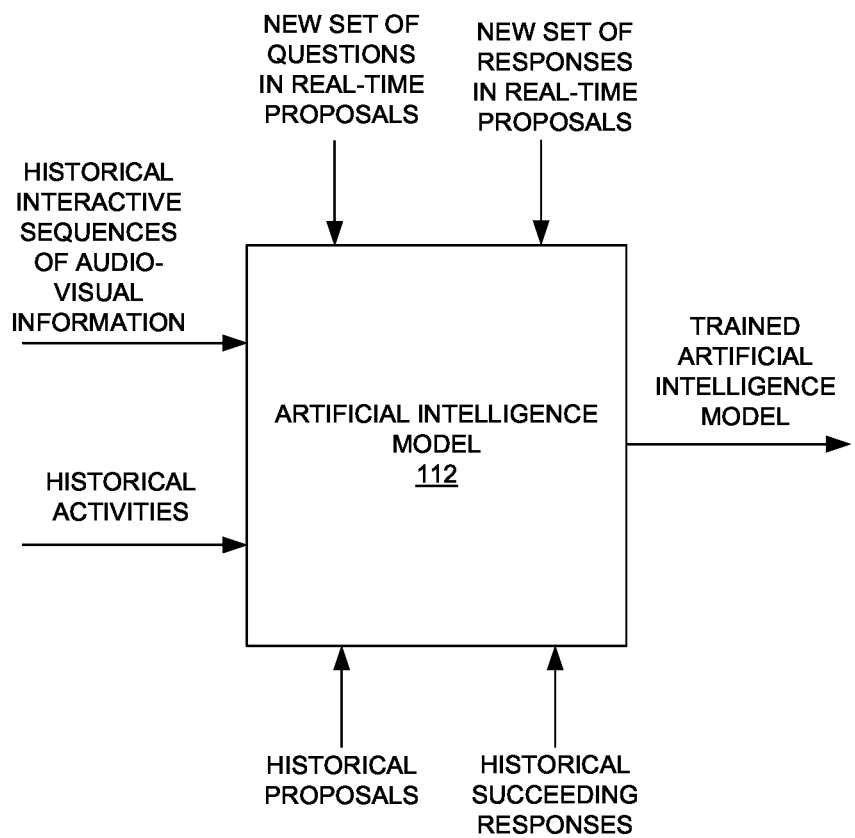
FIG. 4 illustrates an exemplary view of training artificial intelligence model of FIG. 2 according to some embodiments herein.

FIG. 4 illustrates an exemplary view of training artificial intelligence model 112 of FIG. 2 according to some embodiments herein. The artificial intelligence model 112 is trained by providing historical interactive sequences of audio-visual information between the user 102 and the agent 104, historical activities of the user, historical proposals, historical users, historical agents, historical succeeding responses, new set of questions in real-time proposals, new set of responses in real-time proposals. For example, the historical interactive sequences of audio-visual information between the user 102 and the agent 104 may be a conversation between a salesperson and a customer. The conversation of the historical interactive sequence of audio-visual information may be, the salesperson asking the customer "how may I help you?", and the customer replies, "I am looking for assistance in buying a new model car with automated features.". The salesperson may ask the customer, "what would be your likely budget sir so that we can help you to provide best suitable new model car with advanced features", the customer replies, "My budget would be around $80,000", the salesperson replies, "the good choices for the budget of $80,000 would be Mercedes Benz GT, with powered engines, refined cabin quality, touchpad controller in roadster models". The conversation segmenting module 112A analyses the context of the conversation as "sale of a new model car of worth $80,000". The salesperson asks the customer, "Would you like to share your preferences that are related to advanced features like gas mileage, speed, interiors, infotainment with advanced features", the customer replies, "I would like to opt for the advanced features in my budget though the interiors may be of basic", the sales person replies, "The better option would be 2021 Mercedes-AMG GT 43 sedan that starts at $80,900 with a 362-horsepower turbocharged 6-cylinder engine, synthetic leather upholstery, 12.3 inch digital instrument cluster, a sunroof, LED headlights, proximity keyless entry, dual-zone automatic climate control, 64-color interior ambient lighting, a power trunk lid, a remote start".

The historical proposal may be "the good choices for the budget of $80,000 would be Mercedes Benz GT, with powered engines, refined cabin quality, touchpad controller in roadster models". The historical succeeding response may be "I would like to opt the advanced features in my budget through the interiors may be of basic", the sales person replies, "The better option would be 2021 Mercedes-AMG GT 43 sedan that starts at $80,900 with a 362-horsepower turbocharged 6-cylinder engine, synthetic leather upholstery, 12.3 inch digital instrument cluster, a sunroof, LED headlights, proximity keyless entry, dual-zone automatic climate control, 64-color interior ambient lighting, a power trunk lid, a remote start".

Figure 5:
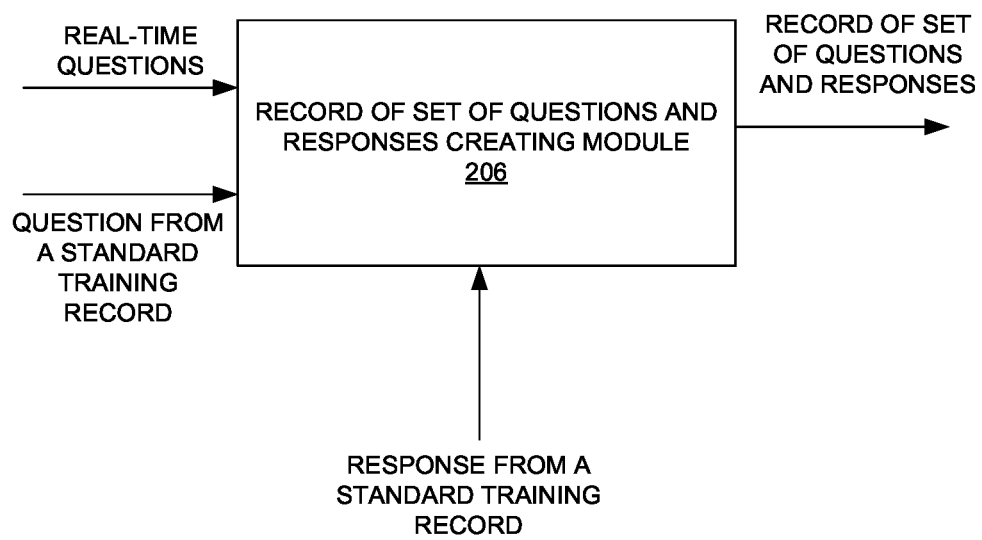
FIG. 5 illustrates an exemplary view of creating a record of a set of questions and responses according to some embodiments herein.

FIG. 5 illustrates an exemplary view of creating a record of a set of questions and responses using creating a record of the set of questions and responses module 206 according to some embodiments herein. The exemplary view includes creating a record of the set of questions and responses module 206 that obtains real-time questions of the user 102, questions from a standard training record, responses from a standard training record as inputs. For example, the questions from a standard training record may be "how may I help you?", "what would be your likely budget sir so that we can help you to provide the best suitable new model car with advanced features". For example, the responses from a standard training record as inputs may be, "the good choices for the budget of $80,000 would be Mercedes Benz GT, with powered engines, refined cabin quality, touchpad controller in roadster models".

Figure 6:
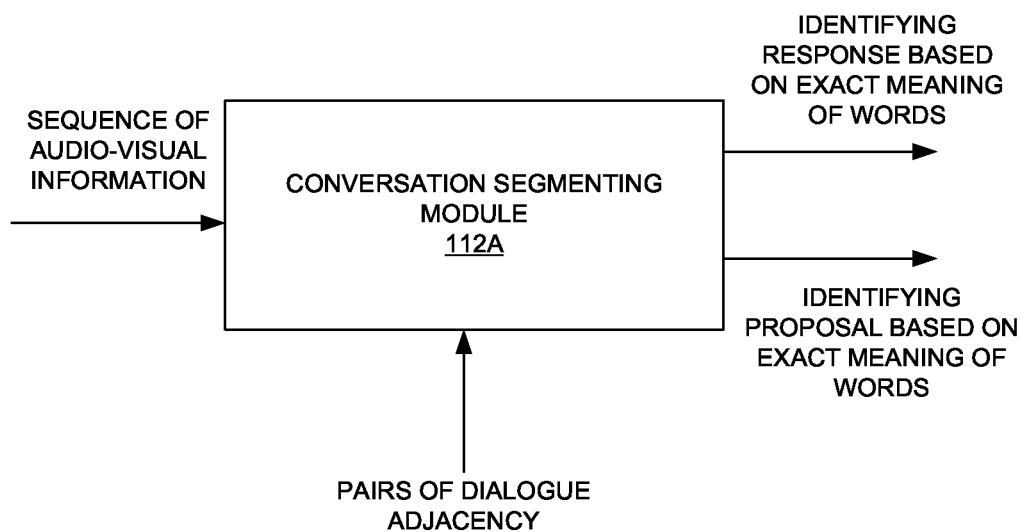
FIG. 6 illustrates an exemplary view of segmenting a conversation of an interactive sequence of audio-visual information according to some embodiments herein.

FIG. 6 illustrates an exemplary view of segmenting a conversation of an interactive sequence of audio-visual information according to some embodiments herein. The exemplary view includes segmenting a conversation of the historical interactive sequence of audio-visual information during a historical proposal by analyzing a context of the conversation to determine an exact meaning of words in the conversation based on the context using semantic analysis technique. For example, the historical proposal may be a conversation between a salesperson and a customer. The conversation of the historical interactive sequence of audio-visual information may be, the salesperson asking the customer "how may I help you?", and the customer replies, "I am looking for assistance in buying a new model car with automated features.". The salesperson may ask the customer, "what would be your likely budget sir so that we can help you to provide a best suitable new model car with advanced features", the customer replies, "My budget would be around $80,000", the salesperson replies, "the good choices for the budget of $80,000 would be Mercedes Benz GT, with powered engines, refined cabin quality, touchpad controller in roadster models". The conversation segmenting module 112A analyses the context of the conversation as "sale of a new model car of worth $80,000". The pairs of dialogue adjacency between the user 102 and the agent 104 identify the exact meaning of words in the conversation. For example, the adjacent pairs that are detected maybe "My budget would be around $80,000", the salesperson replies, "the good choices for the budget of $80,000 would be Mercedes Benz GT, with powered engines, refined cabin quality, touchpad controller in roadster models". The salesperson asks the customer, "Would you like to share your preferences that are related to advanced features like gas mileage, speed, interiors, infotainment with advanced features", the customer replies, "I would like to opt the advanced features in my budget through the interiors may be of basic", the salesperson replies, "The better option would be 2021 Mercedes-AMG GT 43 sedan that starts at $80,900 with a 362-horsepower turbocharged 6-cylinder engine, synthetic leather upholstery, 12.3 inch digital instrument cluster, a sunroof, LED headlights, proximity keyless entry, dual-zone automatic climate control, 64-color interior ambient lighting, a power trunk lid, a remote start".

The conversation segmenting module 112A identifies response based on the exact meaning of words, for example, for the question "My budget would be around $80,000", the salesperson replies, "the good choices for the budget of $80,000 would be Mercedes Benz GT, with powered engines, refined cabin quality, touchpad controller in roadster models".

The conversation segmenting module 112A identifies proposal based on the exact meaning of words, for example, when the customer reveals the requirements in the conversation like "I would like to opt the advanced features in my budget through the interiors may be of basic", then the conversation segmenting module 112A identifies proposal like, "The better option would be 2021 Mercedes-AMG GT 43 sedan that starts at $80,900 with a 362-horsepower turbocharged 6-cylinder engine, synthetic leather upholstery, 12.3 inch digital instrument cluster, a sunroof, LED headlights, proximity keyless entry, dual-zone automatic climate control, 64-color interior ambient lighting, a power trunk lid, a remote start".

Figure 7A:
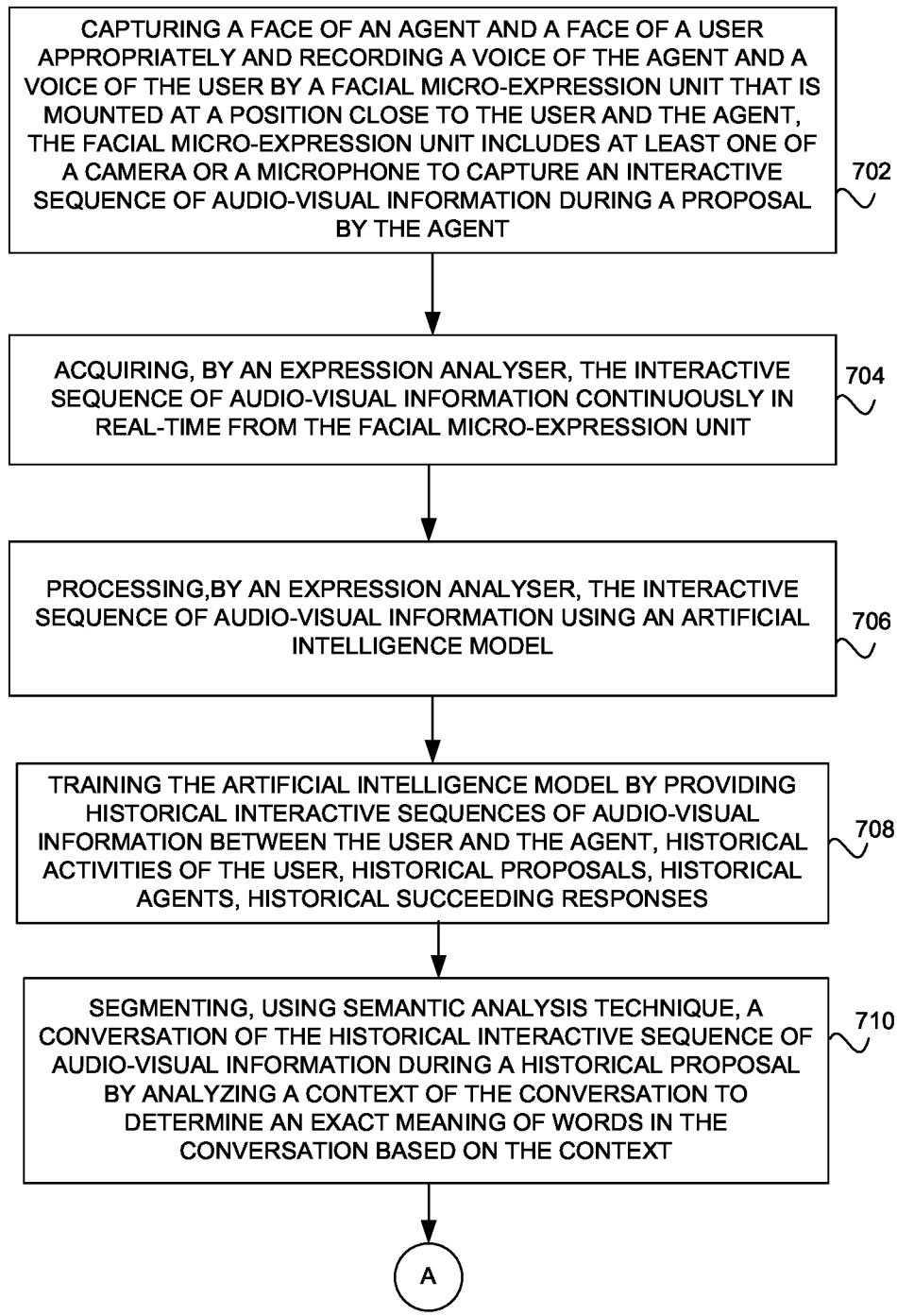
FIGS. 7A-7B are flow diagrams that illustrate a method of automatically classifying an activity of a user during a proposal by an agent using an artificial intelligence model according to some embodiments herein.
Figure 7B:
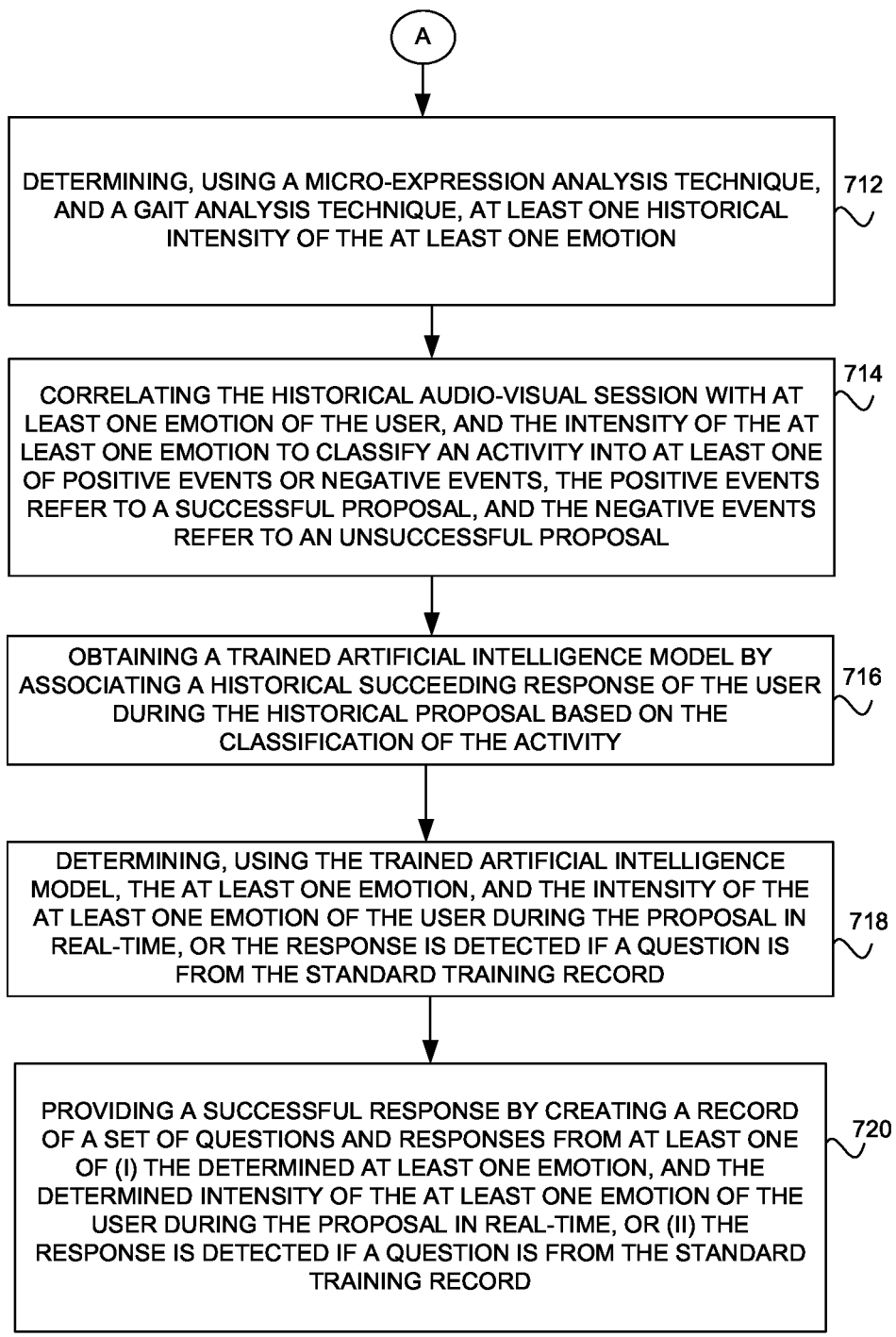

FIGS. 7A-7B are flow diagrams that illustrate a method of automatically classifying an activity of a user 102 during a proposal by an agent 104 using an artificial intelligence model according to some embodiments herein. At step 702, the method includes capturing a face of the agent 104 and a face of the user 102 appropriately and recording a voice of the agent 104 and a voice of the user 102 by a facial micro-expression unit that is mounted at a position close to the user, the facial micro-expression unit includes at least one camera or a microphone to capture an interactive sequence of audio-visual information during the proposal by the agent. At step 704, the method includes acquiring, by an expression analyzer, the interactive sequence of audio-visual information continuously in real-time from the facial micro-expression unit. At step 706, the method includes processing, by an expression analyzer, the interactive sequence of the audio-visual information using the artificial intelligence model. At step 708, the method includes training the artificial intelligence model by providing historical interactive sequences of audio-visual information between the user 102 and the agent, historical activities of the user, historical proposals, historical users, historical agents, historical succeeding responses. At step 710, the method includes segmenting, using semantic analysis technique, a conversation of the historical interactive sequence of audio-visual information during a historical proposal by analyzing a context of the conversation to determine an exact meaning of words in the conversation based on the context. At step 712, the method includes determining, using a micro-expression analysis technique and a gait analysis technique, at least one historical emotion of the user 102 and historical intensity of the at least one emotion. At step 714, the method includes correlating the historical audio-visual session with the at least one emotion of the user, and the intensity of the at least one emotion to classify an activity into at least one of positive events or negative events, the positive events refer to a successful proposal and the negative events refer to an unsuccessful proposal. At step 716, the method includes obtaining a trained artificial intelligence model by associating a historical succeeding response of the user 102 during the historical proposal based on the classification of the activity. At step 718, the method includes determining, using the trained artificial intelligence model, the at least one emotion, and the intensity of the at least one emotion of the user 102 during the proposal in real-time. method includes. At step 720, the method includes providing a successful response by creating, a record of a set of questions and responses from at least one of (i) the determined at least one emotion, and the determined intensity of the at least one emotion of the user 102 during the proposal in real-time, or (ii) the response is detected if a question is from the standard training record the.

In some embodiments, detecting pairs of dialogue adjacency between the user 102 and the agent 104 to identify the exact meaning of words in the conversation.

In some embodiments, combining at least one answer by the agent 104 from the created record of the set of questions and responses based on the pairs of dialogue adjacency when at least one new question is asked by the user.

In some embodiments, retraining the artificial intelligence if there is a misalignment between real-time response and a predicted event for the proposal by the agent 104 to the user.

In some embodiments, identifying a new set of questions asked by the user 102 in the real-time proposals by the agent 104 to the user 102 for training the artificial intelligence model.

In some embodiments, determining at least one muscle point on the face of the user and identifying at least one micro expression of the user and at least one physical movement of the user.

In some embodiments, the proposal is varied using at least one of a user's identity profile, a gender, age, ethnicity detection, or positive or negative responses from the users to make the proposal successful.

In some embodiments, identifying the historical proposal that is successful and unsuccessful related to a group of users for training the agent.

In some embodiments, the interactive sequence of audio-visual information includes at least one of a sequence of visual frames captured by the facial micro-expression unit, or a sequence of audio frames captured by the facial micro-expression unit. In some embodiments, the successful response is communicated to the agent through a wearable device.

The embodiments herein may include a computer program product configured to include a pre-configured set of instructions, which when performed, can result in actions as stated in conjunction with the methods described above. In an example, the pre-configured set of instructions can be stored on a tangible non-transitory computer readable medium or a program storage device. In an example, the tangible non-transitory computer readable medium can be configured to include the set of instructions, which when performed by a device, can cause the device to perform acts similar to the ones described here. Embodiments herein may also include tangible and/or non-transitory computer-readable storage media for carrying or having computer executable instructions or data structures stored thereon.

Generally, program modules utilized herein include routines, programs, components, data structures, objects, and the functions inherent in the design of special-purpose processors, etc. that perform particular tasks or implement particular abstract data types. Computer executable instructions, associated data structures, and program modules represent examples of the program code means for executing steps of the methods disclosed herein. The particular sequence of such executable instructions or associated data structures represents examples of corresponding acts for implementing the functions described in such steps.

The embodiments herein can include both hardware and software elements. The embodiments that are implemented in software include but are not limited to, firmware, resident software, microcode, etc.

A data processing system suitable for storing and/or executing program code will include at least one processor 116 coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 8:
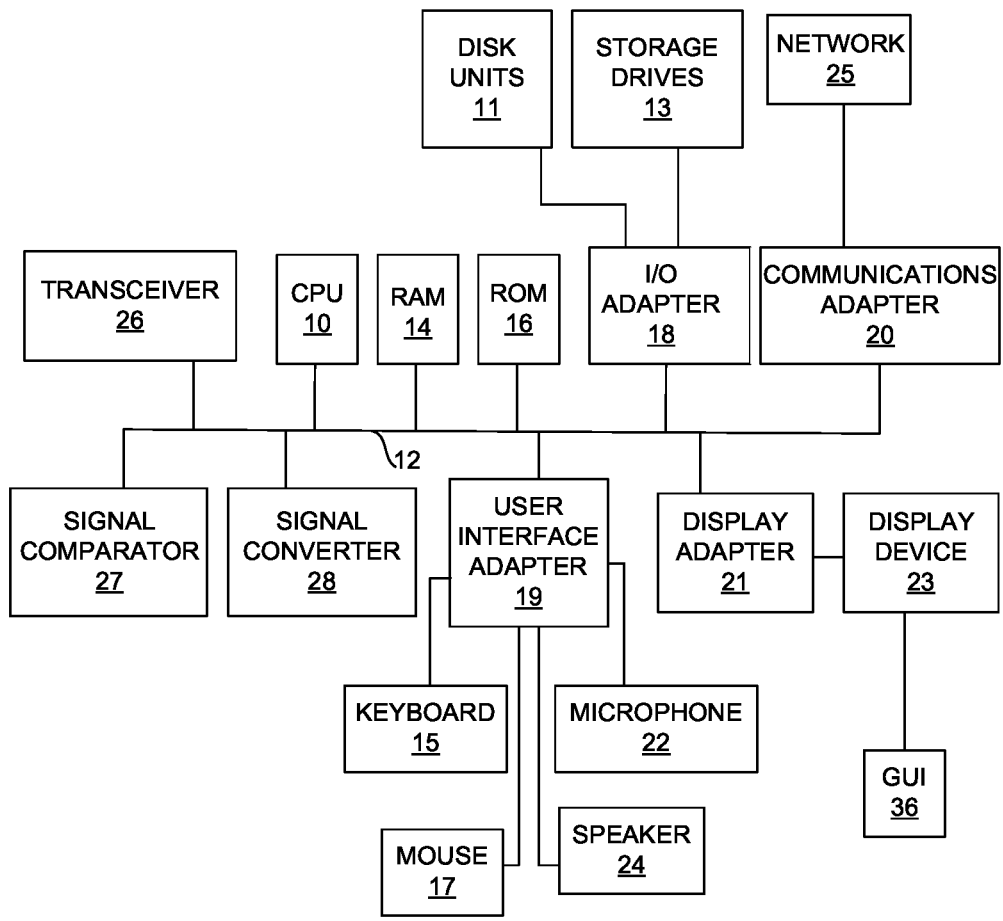
FIG. 8 is a schematic diagram of the computer architecture of a self-learning server in accordance with the embodiments herein.

A representative hardware environment for practicing the embodiments herein is depicted in FIG. 8, with reference to FIGS. 1 through 7B. This schematic drawing illustrates a hardware configuration of an expression analyzer 110/computer system/computing device in accordance with the embodiments herein. The system includes at least one processing device CPU 10 that may be interconnected via system bus 15 to various devices such as a random-access memory (RAM) 12, read-only memory (ROM) 16, and an input/output (I/O) adapter 18. The I/O adapter 18 can connect to peripheral devices, such as disk units 58 and program storage devices 50 that are readable by the system. The system can read the inventive instructions on the program storage devices 50 and follow these instructions to execute the methodology of the embodiments herein. The system further includes a user interface adapter 22 that connects a keyboard 28, mouse 50, speaker 52, microphone 55, and/or other user interface devices such as a touch screen device (not shown) to the bus 15 to gather user input. Additionally, a communication adapter 20 connects the bus 15 to a data processing network 52, and a display adapter 25 connects the bus 15 to a display device 26, which provides a graphical user interface (GUI) 56 of the output data in accordance with the embodiments herein, or which may be embodied as an output device such as a monitor, printer, or transmitter, for example.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the invention.

We claim:

1. A system for automatically classifying an activity of a user during a proposal by an agent to the user based on micro-expression and emotion of the user using an artificial intelligence model, the system comprising:
    a facial micro-expression unit that is mounted at a position close to the user to (i) capture a face of the agent and a face of the user appropriately, and (ii) record a voice of the agent and a voice of the user, wherein the facial micro-expression unit comprises at least one camera or a microphone to capture an interactive sequence of audio-visual information during the proposal by the agent; and
    an expression analyzer that acquires the interactive sequence of audio-visual information continuously in real-time from the facial micro-expression unit and processes the interactive sequence of audio-visual information using the artificial intelligence model, wherein the expression analyzer comprises,
        a memory unit that stores a database and the artificial intelligence model; and
        a processor that is configured to execute a set of instructions and is configured to
            train the artificial intelligence model using historical interactive sequences of audio-visual information between the user and the agent, historical activities of the user, historical proposals, historical users, historical agents, and historical succeeding responses by,
                segmenting, using a semantic analysis technique, a conversation of the historical interactive sequences of audio-visual information during a historical proposal by analyzing a context of the conversation to determine an exact meaning of words in the conversation based on the context;
                determining, using a micro-expression analysis technique and a gait analysis technique, at least one historical emotion of the user and historical intensity of the at least one historical emotion;
                correlating a historical audio-visual session with the at least one historical emotion of the user, and the historical intensity of the at least one historical emotion to classify an activity into at least one of positive events or negative events, wherein the positive events refer to a successful proposal and the negative events refer to an unsuccessful proposal; and
                obtaining a trained artificial intelligence model by associating a historical succeeding response of the user during the historical proposal based on the classification of the activity;
            determine, using the trained artificial intelligence model, at least one emotion, and an intensity of the at least one emotion of the user during the proposal in real-time; and
            providing a successful response to the agent by creating a record of a set of questions and responses from the determined at least one emotion, and the determined intensity of the at least one emotion of the user during the proposal in real-time.

2. The system as claimed in claim 1, wherein the processor is configured to detect pairs of dialogue adjacency between the user and the agent to identify the exact meaning of words in the conversation.

3. The system as claimed in claim 2, wherein the processor is configured to identify a historical proposal that is successful or unsuccessful related to a group of users for training the agent.

4. The system as claimed in claim 2, wherein the processor is configured to combine at least one answer by the agent from the created record of the set of questions and responses based on the pairs of dialogue adjacency when at least one new question is asked by the user.

5. The system as claimed in claim 1, wherein the processor is configured to retrain the artificial intelligence if there is a misalignment between real-time response and a predicted event for the proposal by the agent to the user.

6. The system as claimed in claim 1, wherein the processor is configured to identify a new set of questions asked by the user in the real-time proposals by the agent to the user for training the artificial intelligence model.

7. The system as claimed in claim 1, wherein the processor is configured to determine at least one muscle point on the face of the user and identifying at least one micro expression of the user and at least one physical movement of the user.

8. The system as claimed in claim 1, wherein the proposal is varied using at least one of a user's identity profile, a gender, age, ethnicity detection, or positive or negative responses from users to make the proposal successful.

9. The system as claimed in claim 1, wherein the interactive sequence of audio-visual information comprises at least one of a sequence of visual frames captured by the facial micro-expression unit, or a sequence of audio frames captured by the facial micro-expression unit, wherein the successful response is communicated to the agent through a wearable device.

10. A processor-implemented method for automatically classifying an activity of a user during a proposal by an agent to the user based on micro-expression and emotion of the user using an artificial intelligence model, the method comprising:
capturing a face of the agent and a face of the user appropriately, and recording a voice of the agent and a voice of the user by a facial micro-expression unit that is mounted at a position close to the user, wherein the facial micro-expression unit comprises at least one camera or a microphone to capture an interactive sequence of audio-visual information during the proposal by the agent;
acquiring, by an expression analyzer, the interactive sequence of audio-visual information continuously in real-time from the facial micro-expression unit and processing the interactive sequence of audio-visual information using the artificial intelligence model;
training the artificial intelligence model using historical interactive sequences of audio-visual information between the user and the agent, historical activities of the user, historical proposals, historical users, historical agents, and historical succeeding responses by,
segmenting, using a semantic analysis technique, a conversation of the historical interactive sequences of audio-visual information during a historical proposal by analyzing a context of the conversation to determine an exact meaning of words in the conversation based on the context;
determining, using a micro-expression analysis technique and a gait analysis technique, at least one historical emotion of the user and historical intensity of the at least one historical emotion;
correlating a historical audio-visual session with the at least one historical emotion of the user, and the historical intensity of the at least one historical emotion to classify an activity into at least one of positive events or negative events, wherein the positive events refer to a successful proposal and the negative events refer to an unsuccessful proposal; and
obtaining a trained artificial intelligence model by associating a historical succeeding response of the user during the historical proposal based on the classification of the activity;
determining, using the trained artificial intelligence model, at least one emotion, and an intensity of the at least one emotion of the user during the proposal in real-time; and
providing a successful response to the agent by creating a record of a set of questions and responses from the determined at least one emotion and the determined intensity of the at least one emotion of the user during the proposal in real-time.

* * * * *